United States Patent
Shibata

[11] Patent Number: 5,931,072
[45] Date of Patent: Aug. 3, 1999

[54] CIRCULAR SAW WITH AN IMPROVED DUST COLLECTOR

[75] Inventor: Yoshinori Shibata, Anjo, Japan

[73] Assignee: Makita Corporation, Aichi-pref., Japan

[21] Appl. No.: 08/895,213

[22] Filed: Jul. 16, 1997

[30] Foreign Application Priority Data

Jul. 23, 1996 [JP] Japan .................................. 8-193468

[51] Int. Cl.$^6$ ...................................................... B26D 7/06
[52] U.S. Cl. ................................ 83/98; 83/100; 83/471.3; 83/490; 451/453; 451/456
[58] Field of Search ........................... 83/98, 100, 471.3, 83/490; 451/453, 456

[56] References Cited

U.S. PATENT DOCUMENTS

| | | |
|---|---|---|
| 3,525,183 | 8/1970 | Gargrave . |
| 4,063,478 | 12/1977 | Stuy .......................................... 83/100 |
| 4,241,505 | 12/1980 | Bodycomb, Jr. et al. ................ 83/100 |
| 4,367,665 | 1/1983 | Terpstra et al. ........................... 83/167 |
| 4,974,907 | 12/1990 | Komura ..................................... 83/100 |
| 5,042,348 | 8/1991 | Brundage et al. ...................... 83/471.3 |
| 5,060,548 | 10/1991 | Sato et al. ........................... 83/471.003 |
| 5,063,802 | 11/1991 | Shiotani et al. ............................. 83/98 |
| 5,084,972 | 2/1992 | Waugh ....................................... 83/100 |
| 5,184,534 | 2/1993 | Lee ............................................ 83/397 |
| 5,203,245 | 4/1993 | Terpstra ..................................... 83/397 |
| 5,370,025 | 12/1994 | Itzov ......................................... 83/397 |
| 5,437,214 | 8/1995 | Sasaki et al. ........................... 83/471.3 |
| 5,445,056 | 8/1995 | Folci ......................................... 83/100 |

FOREIGN PATENT DOCUMENTS

| | | |
|---|---|---|
| 407204 | 1/1991 | European Pat. Off. ............ 83/DIG. 1 |
| 29 43 001 A1 | 5/1981 | Germany . |
| 36 15 736 A1 | 11/1987 | Germany . |
| 89 06 261 | 8/1989 | Germany . |
| 90 16 821 | 5/1991 | Germany . |
| 42 05 965 C1 | 7/1993 | Germany . |
| 43 02 674 A1 | 8/1994 | Germany . |
| 195 08 044 A1 | 9/1995 | Germany . |
| 195 23 348 A1 | 1/1996 | Germany . |

Primary Examiner—Lee W. Young
Assistant Examiner—Kevin G. Vereene
Attorney, Agent, or Firm—Lahive & Cockfield, LLP

[57] ABSTRACT

A dust collection nozzle (12) is provided through the upper blade guard 7 of a circular saw (1). The dust collection nozzle (12) includes a flared, horn-shaped dust capturing section (13) having a rectangular opening at the front end thereof, and a cylindrical dust outlet tube (14) connected to the rear end of the dust capturing section (13). Throughout cutting operations, the opening (16) remains directed toward the lower portion of the saw blade (8) so as to collect dust and other debris generated from a saw blade (8) rotatable attached to the upper blade guard. The dust collection nozzle (12) also includes a pair of dust guide plates (17, 18) formed on and extended from the opening (16). The dust guide plates (17, 18) extend in parallel to each other so as to interpose the saw blade (8) therebetween. Furthermore, provided to the right of the dust guide plate (18) is a flow straightening plate (19) extending in parallel to plates (17) and (18) from the upper to lower edges of the opening (16). Also, the flow straightening plate (19) extends into the dust capturing section (13), thus partitioning the dust collection passage into two sections, and terminates at the boundary between the capturing section (13) and the dust outlet tube (14). The plates (17) and (19), and the dust capturing section (13) jointly define an air flow cavity (20). The flow straightening plate (19) divides the opening closer to the right side edge of the opening (16) than the left side edge in order to widen the air flow cavity (20).

17 Claims, 5 Drawing Sheets

CIRCULAR SAW WITH AN IMPROVED DUST COLLECTOR

BACKGROUND OF THE INVENTION

1. Field of the Invention

The present invention relates to a circular saw in which a work piece placed on the saw's base is cut by a rotary circular saw blade, and more particularly, to improvements in a dust collector for use in such circular saws.

2. Description of the Related Art

A typical circular saw includes a base on which a work piece is set and a vertically pivotable saw assembly including a rotary circular saw blade normally urged upward by a spring. The circular saw further includes an arm mounted on the base and supporting the saw assembly, and a dust collection passage generally defined by a through-hole or a nozzle portion provided in the arm of the saw assembly. The dust collection passage, typically having an opening directed toward the cutting edge of the saw blade, collects dust, chips, and other debris blown toward the arm by airflow caused by the rotating circular saw blade and guides such debris for collecting and subsequent trapping and/or discharge at the rear of the saw assembly. With this arrangement, dust and other debris, typically generated from cut work pieces, is not scattered across the base. By configuring the opening of the dust collection passage in a flared, horn-like shape, dust can be caught efficiently in most cases even when the direction in which the dust travels changes as the saw blade cuts deeper into a work piece during cutting operation.

However, while the above-described example usually works adequately, there are several noticeable deficiencies which have not been solved by conventional dust collection arrangements. One area of deficiency relates to the manner in which the dust collection passage with a flared opening is designed; since the dust collection passage is increasingly narrower toward the exhaust outlet thereof (i.e., its cross sectional area decreases towards the exhaust outlet), the air pressure near the outlet of the passage is higher, often causing turbulence at the narrower portion. This may in turn cause some dust to adhere to the inner wall of the dust collection passage, or in the worst case, creates a counter flow of air, and hence dust, to the opening, thereby lowering the dust collecting efficiency.

Another area of deficiency is related to the smooth operation of the above-described spring, which is typically made of a compression or torsion spring. Since this spring has been connected to a supporting shaft or to the arm with no protection against dust, dust or chips tend to become caught in the gaps in the exposed spring, adversely affecting the operation of the spring and/or the smooth vertical movement of the saw assembly.

SUMMARY OF THE INVENTION

In view of the above-identified problems, an object of the present invention is to provide a circular saw having a dust collection passage with a flared opening that smoothly funnels dust without causing air turbulence thereby improving the efficiency of dust collection or discharge.

Another objective of the present invention is to provide a circular saw that effectively prevents dust from being caught in the above-described spring.

The above objects and other related objects are realized by providing a circular saw which includes: a base on which a work piece is placed; a saw assembly vertically pivotally attached to the base and upwardly urged by a spring member, the saw assembly having a saw blade rotatably mounted thereon; a dust collection passage formed behind the saw blade and having a horn-shaped portion for capturing dust blown by the saw blade, the dust collection passage guiding dust therethrough to the rear of the saw assembly; and a flow straightening plate provided along the dust collection passage, for straightening airflow in the rear direction within the dust collection passage.

According to one aspect of the present invention, the dust collection passage is defined by a nozzle disposed close to the spring member, with the nozzle having a spring cover extending therefrom over at least the part of the spring member that faces the saw blade.

According to another aspect of the present invention, the nozzle includes a dust capturing section corresponding to the horn-shaped portion of the dust collection passage and a dust outlet tube coupled to the end of the dust capturing section opposite the saw blade.

According to still another aspect of the present invention, the nozzle further includes a rectangular opening at the end of the dust capturing section facing the saw blade. Preferably, the rectangular opening is provided with upper, lower, right side, and left side edges.

According to yet another aspect of the present invention, the flow straightening plate is extended in parallel to the saw blade.

Preferably, the flow straightening plate extends from the opening into the dust capturing section, thereby dividing the dust capturing section into two compartments, and terminates where the dust outlet tube is coupled to the dust capturing section.

In accordance with another aspect of the present invention, one of the two compartments has a larger cross sectional area orthogonal to the dust collection passage than that of the other, smaller compartment.

In another preferred mode of the present invention, the compartment with a larger cross sectional area is located on the saw blade side of the flow straightening plate while the compartment with a smaller cross sectional area is located on the opposite side of the flow straightening plate.

In carrying out the invention in one preferred mode, the circular saw further includes a pair of dust guide plates extended from the opening of the nozzle in parallel with the saw blade so as to interpose the saw blade therebetween.

In one aspect, the cover is extended from the lower edge of the opening.

In another aspect, the nozzle further includes two side flanges formed on the right and left side edges of the opening, for blocking dust blown thereto by the saw blade.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

With reference to the attached drawings, a preferred embodiment of the present invention will be explained.

Figure 1:
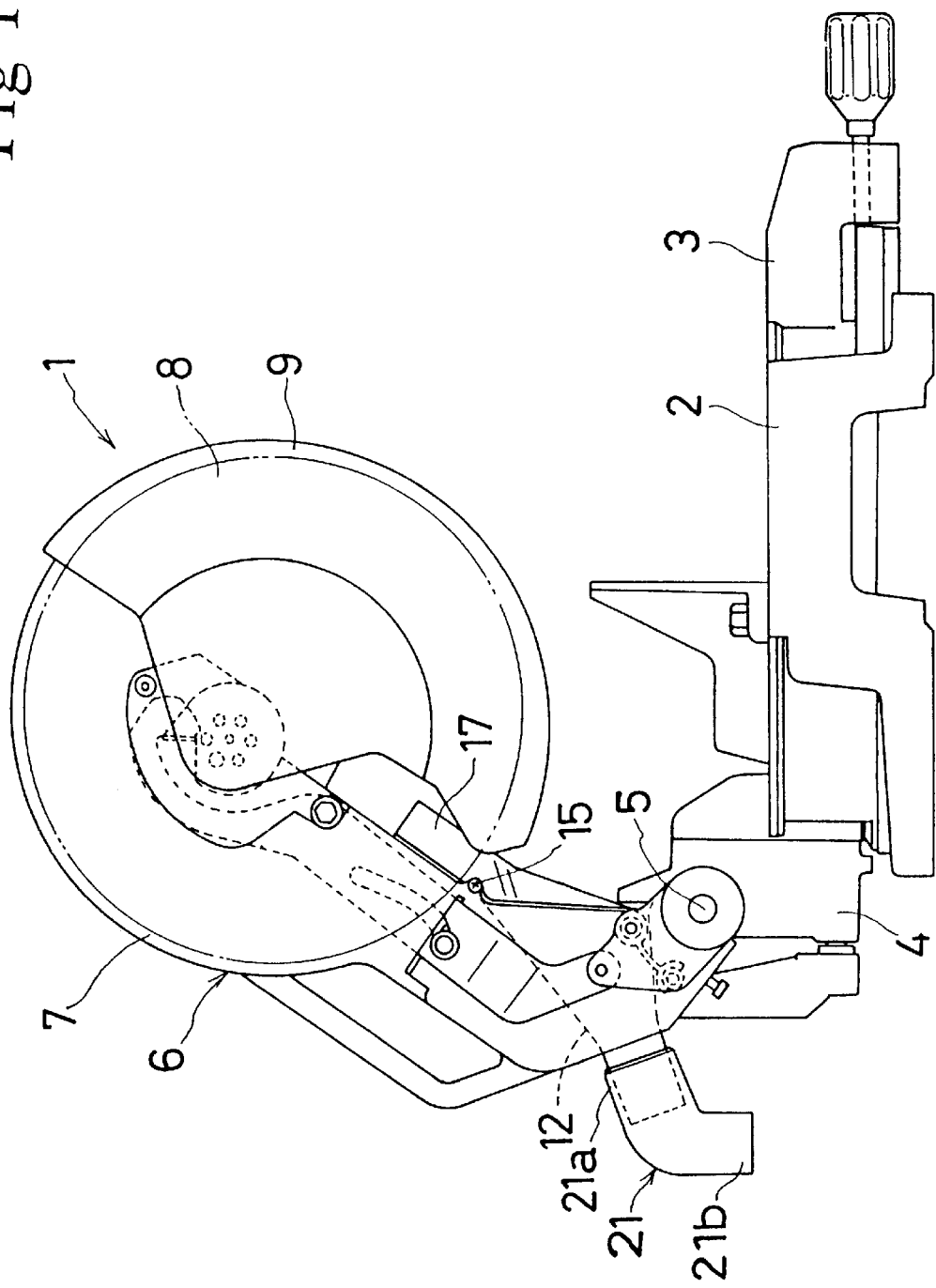
FIG. 1 is a side elevational view of a circular saw in accordance with the present invention.
Figure 2:
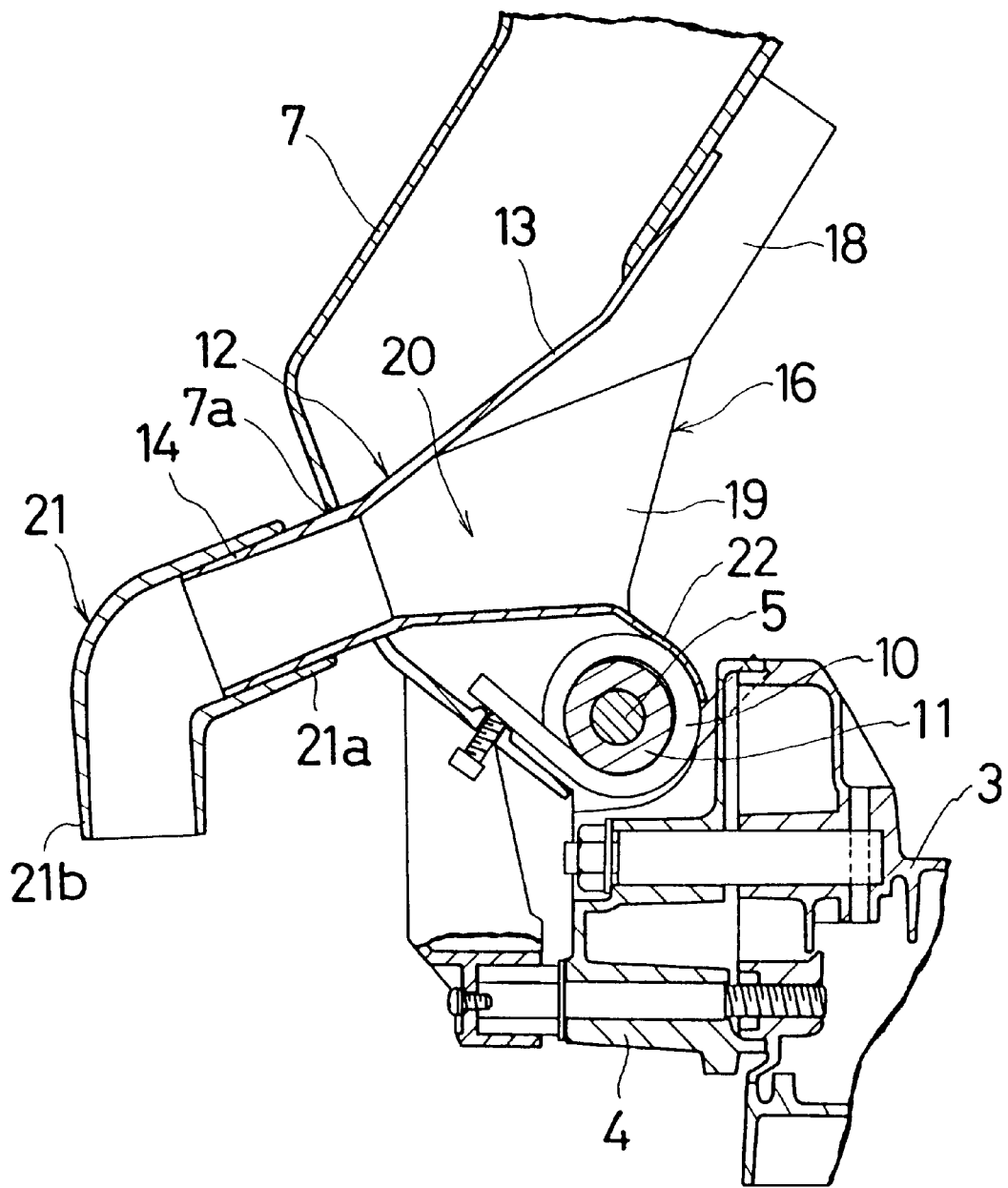
FIG. 2 is an enlarged cross sectional view of the area of the circular saw of FIG. 1 where a dust collection nozzle is attached to the circular saw.

FIG. 1 is a side elevation of a circular saw 1. FIG. 2 is an enlarged cross sectional view of the area of the circular saw 1 where a dust collection nozzle 12 (to be explained in detail later) is attached to the saw 1. Reference numeral 2 designates a base on which a turntable 3 is rotatably mounted. An arm 4 is attached to the rear end of the turntable 3 (the right side of FIG. 1 is referred to as front or forward and the left side is referred to as rear or back throughout the specification). A saw assembly 6 is vertically pivotally attached to the top of the arm 4 with a pivot shaft 5. The saw assembly 6 includes an upper blade guard 7, a circular saw blade 8 with the approximate upper half thereof received within the upper blade guard 7, a motor (not shown) for rotating the circular saw blade 8, and a lower blade guard 9. The saw assembly 6 is normally urged into an upper rest position by a torsion spring 10. Reference numeral 11 designates a sleeve fitted around the pivot shaft 5.

Figure 4:
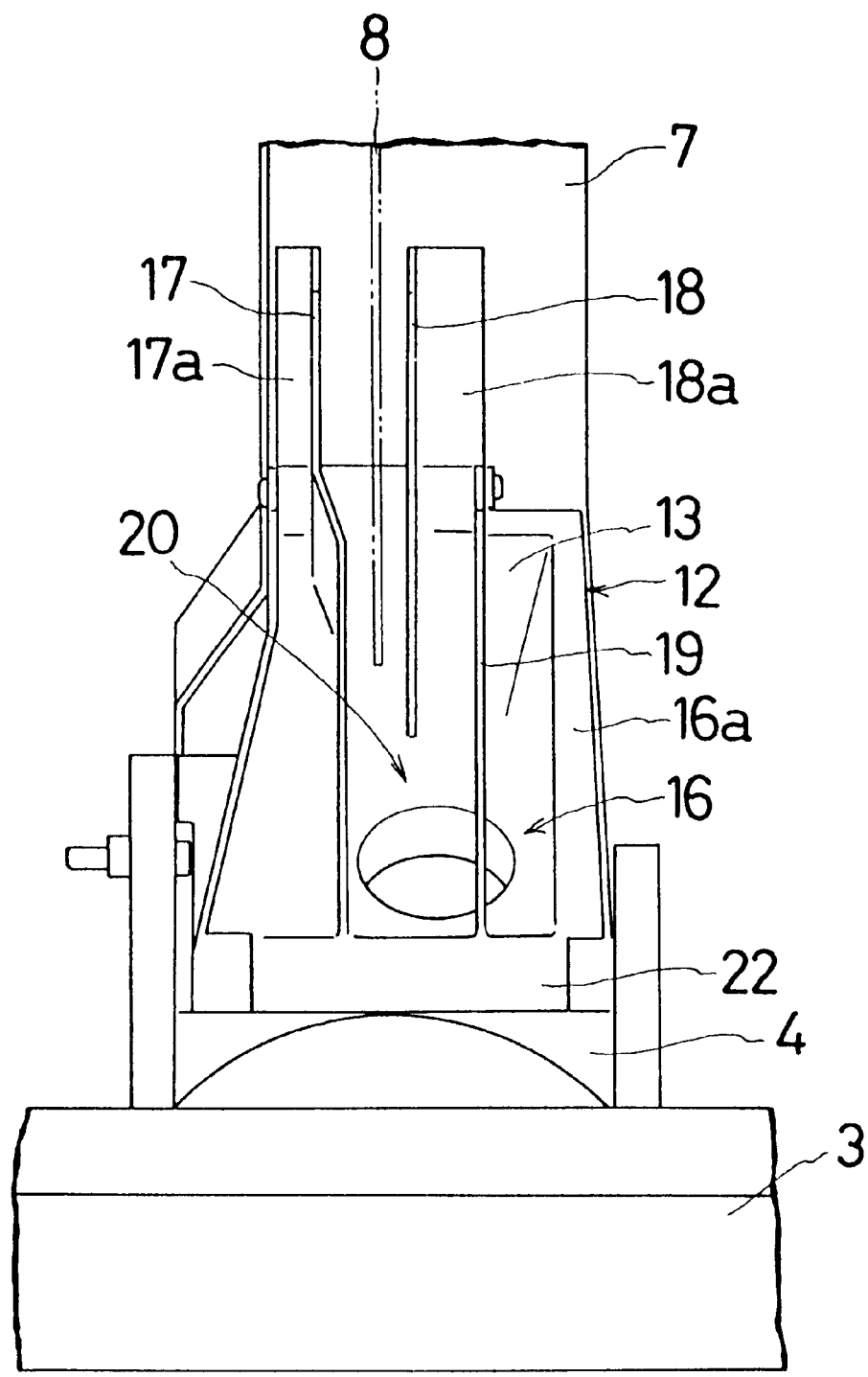
FIG. 4 is an elevational view of the dust collection nozzle attached to the circular view of FIG. 1.

With specific reference to FIG. 2, provided through the upper blade guard 7 and immediately above and adjacent to the pivot shaft 5 is the dust collection nozzle 12 defining a dust collection passage that places the front of the upper blade guard 7 in communication with the rear thereof The dust collection nozzle 12 includes a flared, horn-shaped dust capturing section 13 having a rectangular opening at the front end thereof As best shown in FIG. 4, the rectangular opening 16 is configured such that its top and bottom horizontal sides are arranged parallel to the top surface of the turntable 3 and the longitudinal sides are orthogonal to the horizontal sides. Also included in the dust collection nozzle 12 is a cylindrical dust outlet tube 14 connected to the rear end of the dust capturing section 13. Referring again to FIG. 2, the dust outlet tube 14 is fitted into the aperture 7a in the upper blade guard 7 while the capturing section 13 is fastened at its the upper portion to the upper blade guard 7 with a pair of screws 15 (only one screw is shown). As the saw assembly 6 pivots during cutting operation, the dust collection nozzle 12, thus constructed, keeps the opening 16 directed toward the lower portion of the saw blade 8 to collect dust effectively (see FIG. 5).

Figure 3:
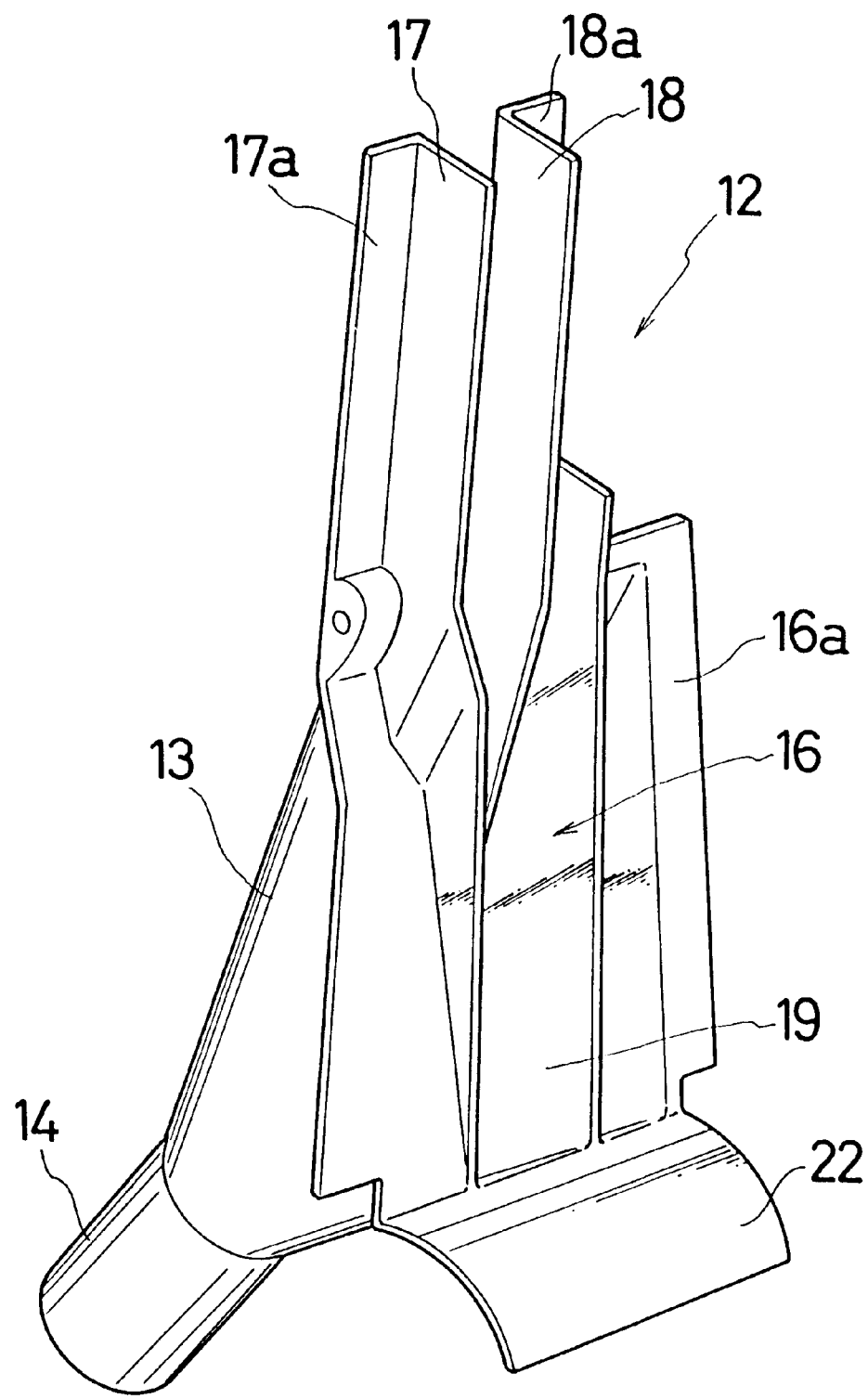
FIG. 3 is a perspective view of the dust collection nozzle of the circular saw of FIG. 1.

Referring now to FIGS. 3 and 4, a pair of dust guide plates 17 and 18 are extended from the opening 16 in parallel with each other and the saw blade such that the saw blade is interposed therebetween. The dust guide plate 17 extends from the lower end of the opening 16 along the left side edge of the opening 16 beyond the upper end of the opening 16. On the other hand, the dust guide plate 18 starts to taper off at about the opening 16 along the dust capturing section 13 while extending in a similar manner to the dust guide plate 17 above the opening 16. The two dust guide plates 17 and 18 function together to guide dust blown backward from the saw blade 8 into the dust capturing section 13.

Furthermore, provided to the right of the dust guide plate 18 is a flow straightening plate 19 extending in parallel to plates 17 and 18 from the upper edge to the lower edge of the opening 16. Additionally, the flow straightening plate 19 extends into the dust capturing section 13, thus partitioning the dust collection passage into two compartments, and terminates at the boundary between the capturing section 13 and the dust outlet tube 14. The plates 17 and 19 and the dust capturing section 13 jointly define an air flow cavity 20. The flow straightening plate 19 is positioned such that it divides the opening closer to the right side edge of the opening 16 than the left side edge in order to widen the air flow cavity 20. Reference numeral 17a indicates a flange extending along the dust guide plate 17 and the left side edge of the opening 16 for the purpose of covering the gap between the upper blade guard 7 and the dust collection nozzle 12 and preventing entry of dust. Likewise, flanges 16a and 18a are formed along the dust guide plate 18 and the right side edge of the opening 16, respectively, for the same purpose. As illustrated, the flanges 17a and 18a are connected to the dust guide plates 17 and 18 at right angles.

The peripheral wall of the dust outlet tube 14 becomes increasingly thinner toward its rear end, to which an elbow 21 (a bent cylindrical connector) is coupled. The elbow 21 can be freely rotated on the dust outlet tube 14 to a direction in which collected dust is to be discharged from the circular saw 1. In order to connect the elbow 21 to outlet tubes of different diameters, the inner and outer diameters of the end portion 21a are made larger than those of the end portion 21b, with the peripheral wall of the elbow 21 made increasingly thinner from its center toward both of its ends. Thus, depending on its size, an appropriate end portion is selected either to fit into or over the outlet tube 14.

As best shown in FIGS. 2 and 4, the dust collection nozzle 12 has an outwardly curved spring cover 22 extended obliquely from the lower end of the opening 16. When the saw assembly 6 is in the top dead center or the upper rest position, the spring cover 22 fits over the part of the torsion spring 10 facing the cutting edge of the saw blade 8 to prevent dust generated from work pieces from entering the gaps in the torsion spring 10. When the cover 22 is lowered as the saw blade 8 cuts deeper in the work piece, the dust caught between the spring cover 22 and the arm 4 is cleared away by the cover 22, so that the dust falls off behind the arm 4.

It should be noted that the spring cover 22, integrally formed with the dust collection nozzle 12, covers the torsion spring 10 when the nozzle 12 is installed on the saw 1, thereby saving assembly cost and labor.

Figure 5:
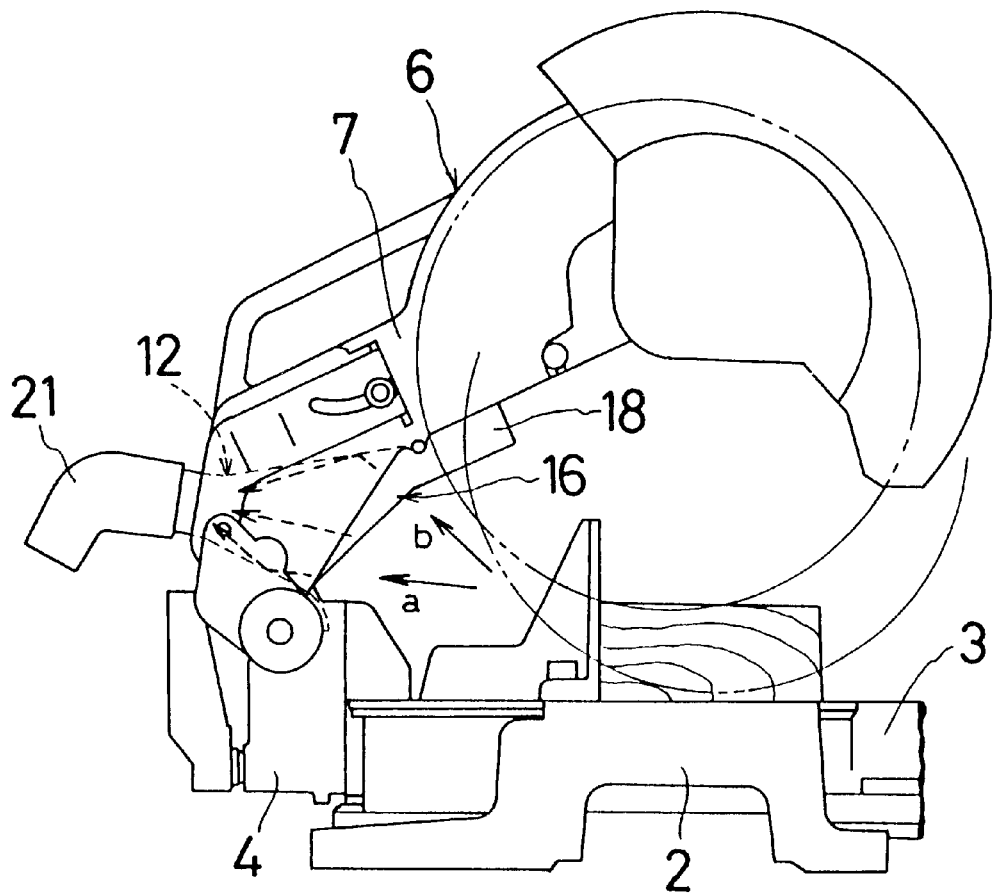
FIG. 5 is a side elevational view of the circular saw of FIG. 1, illustrating the circular saw blade in two cutting positions.

In the operation of the circular saw 1 thus constructed, the saw assembly 6 is lowered to cut the work piece placed on the turntable 3. As shown in FIG. 5, most dust or chips are blown substantially horizontally in the rear direction behind the saw blade 8 (as indicated by arrow a) in the beginning of cutting operation. On the other hand, when the saw blade is cutting deeply into the work piece, most debris is blown upward behind the saw blade 8 (as indicated by arrow b). The debris blown substantially horizontally either directly enters the dust capturing section 13 or is guided into the dust collection passage after hitting the lower wall of the dust capturing section 13. The dust blown upward mostly hits the upper wall of the dust capturing section 13 and then enters the dust collection passage. As described above, the space within the portion 13 immediately behind the saw blade 8 is divided into right and left compartments by the flow straightening plate 19. Therefore, as indicated by the broken-line arrows in FIG. 6, air flows fast and straight along both sides (especially the left side) of the plate 19 into the outlet tube 14 without causing turbulence in the air flow cavity 20. Accordingly, blown dust is directed smoothly into the outlet tube 14 without clogging the air flow cavity 20 or returning to the opening 16. Subsequently, dust travels out of the elbow 21 through the collecting passage. A dust bag, dust collector, or some other appropriate device may be attached to the end of the elbow 21 for dust disposal.

Figure 6:
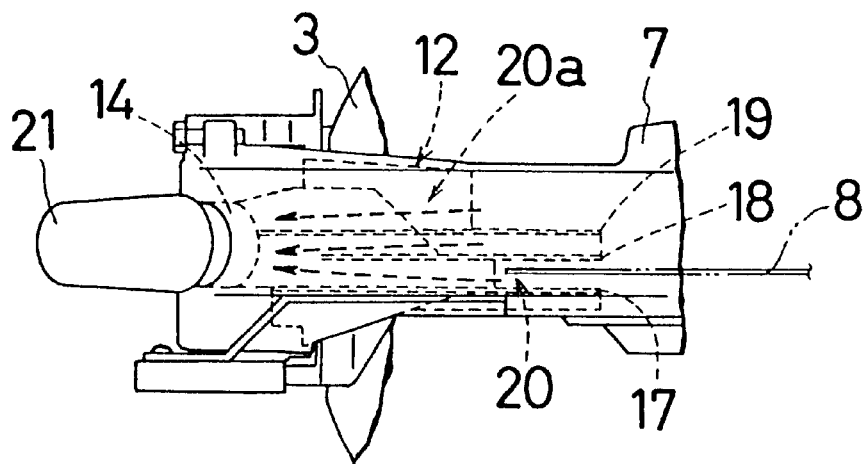
FIG. 6 is a plan view of the dust collection nozzle of FIG. 1, illustrating the airflow therethrough.

Still referring to FIG. 6, the flow straightening plate 19 defines space 20a on the side opposite to the air flow cavity 20. Space 20a, not located immediately behind the saw blade 8, does not have as high a dust collecting efficiency as the air flow cavity 20. However, when a dust collector is attached to the outlet tube 14, the dust collecting efficiency of the space 20a also improves.

As can be appreciated from the foregoing description, the dust collection nozzle according to the present invention, though having a flared, horn-like shape, still realizes a high dust collecting efficiency.

Instead of installing a separately formed nozzle in the upper blade guard as in this embodiment, a similarly configured through hole may be integrally formed in the arm or the upper blade guard. If a similar flow straightening plate is provided, the same high dust collecting efficiency can be expected from such a modification.

It should be noted that more than one flow straightening plate may be provided, for example two plates interposing the saw blade therebetween. Furthermore, the flow straightening plate may be formed in various shapes such as curved or corrugated plates, instead of the flat shape as in the above embodiment, depending on the design of the dust collection passage.

Moreover, the mounting position of the dust collection nozzle (the location of the dust collection passage) may be changed to suite particular applications without departing from the scope of the invention; it can be installed in the arm or separately provided at the rear of the base.

The spring cover may also be positioned other than at the lower end of the dust collection nozzle. Depending on the location of the torsion spring, the cover may be positioned either to the left or the right of the nozzle.

As any number of further modifications, alterations, and changes are possible without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A circular saw, comprising:
    a base on which a work piece is placed,
    a saw assembly pivotally attached to the base for vertically pivoting the saw assembly, the saw assembly having an upper blade guard including an aperture therethrough, the saw assembly being upwardly urged by a spring member and having a saw blade rotatably mounted thereon,
    dust collection means forming a dust collection passage behind the saw blade, the dust collection means being positioned within the aperture in the upper blade guard, the dust collection passage having a horn-shaped portion for capturing dust blown by the saw blade and for guiding dust therethrough to a rear portion of the saw assembly, and
    a flow straightening plate, provided within the dust collection passage, for straightening airflow in a rearward direction within the dust collection passage.

2. A circular saw in accordance with claim 1 wherein the dust collection means includes a nozzle defining the dust collection passage and disposed close to the spring member, the nozzle having a spring cover extending therefrom, the spring cover extending over at least a part of the spring member that faces the saw blade.

3. A circular saw in accordance with claim 2 wherein the nozzle further comprises an opening for capturing dust at one end of the dust collection passage, and a dust outlet tube coupled to the other end of the dust collection passage.

4. A circular saw in accordance with claim 3 wherein the nozzle opening is a rectangular opening facing the saw blade, the rectangular opening having upper, lower, right side, and left side edges.

5. A circular saw in accordance with claim 1 wherein the flow straightening plate extends parallel to the saw blade.

6. A circular saw in accordance with claim 3 wherein the flow straightening plate extends from the opening into the dust collection passage, thereby dividing the dust collection into two compartments, and terminates where the dust outlet tube is coupled to the dust collection passage.

7. A circular saw in accordance with claim 6 wherein one of the two compartments has a larger cross sectional area orthogonal to the dust collection passage relative to the other, smaller compartment.

8. A circular saw in accordance with claim 7 wherein the compartment with the larger cross sectional area is located on the saw blade side of the flow straightening plate while the compartment with the smaller cross sectional area is located on the opposite side of the flow straightening plate.

9. A circular saw in accordance with claim 3 further comprising a pair of dust guide plates extending from the opening of the nozzle and disposed in parallel with the saw blade so as to interpose the saw blade therebetween.

10. A circular saw in accordance with claim 3 wherein the spring cover extends from the lower edge of the nozzle opening.

11. A circular saw in accordance with claim 3 wherein the nozzle further includes two side flanges formed on right and left side edges of the opening, for blocking dust blown by the saw blade.

12. A circular saw in accordance with claim 4 further comprising a pair of dust guide plates extending from the opening of the nozzle and disposed in parallel with the saw blade so as to interpose the saw blade therebetween.

13. A circular saw in accordance with claim 5 further comprising a pair of dust guide plates extending from the opening of the nozzle and disposed in parallel with the saw blade so as to interpose the saw blade therebetween.

14. A circular saw in accordance with claim 6 further comprising a pair of dust guide plates extending from the opening of the nozzle and disposed in parallel with the saw blade so as to interpose the saw blade therebetween.

15. A circular saw in accordance with claim 7 further comprising a pair of dust guide plates extending from the opening of the nozzle and disposed in parallel with the saw blade so as to interpose the saw blade therebetween.

16. A circular saw in accordance with claim 8 further comprising a pair of dust guide plates extending from the opening of the nozzle and disposed in parallel with the saw blade so as to interpose the saw blade therebetween.

17. Dust collection apparatus for use with a saw assembly rotatably mounting a saw blade for cutting a workpiece placed on a base, the saw assembly having an upper blade guard including an aperture therethrough, said apparatus comprising
    dust collection means forming a dust collection passage, said dust collection means being positioned within the aperture in the upper blade guard, said dust collection means including a horn shaped dust-capturing section having an opening to the passage for capturing dust blown by the saw blade, the dust collection passage guiding dust therethrough to the rear of the saw assembly, a dust outlet tube coupled to the dust capturing section, and a flow straightening plate provided within the dust collection passage, for straightening airflow in the rear direction within the dust collection passage, the flow straightening plate extending from the opening into the dust capturing section to the coupling of the dust outlet tube to the dust capturing section, and dividing the dust capturing section into two compartments.

* * * * *